(No Model.)
M. MILLER.
BARREL TRUCK AND SUPPORT.
No. 333,144. Patented Dec. 29, 1885.
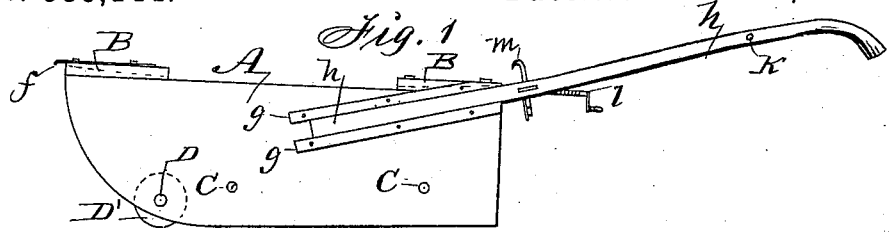
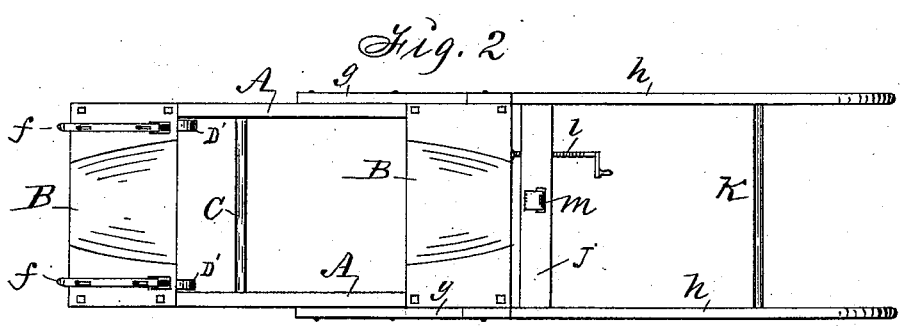
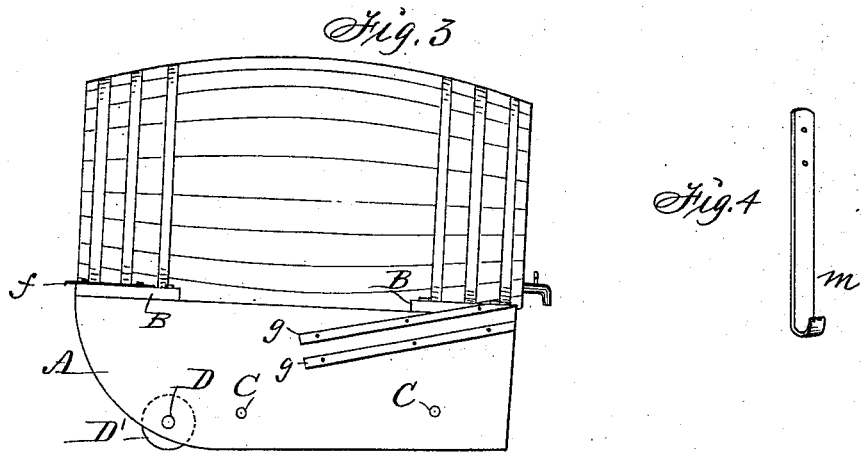
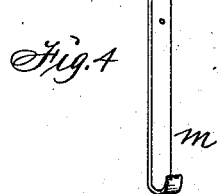
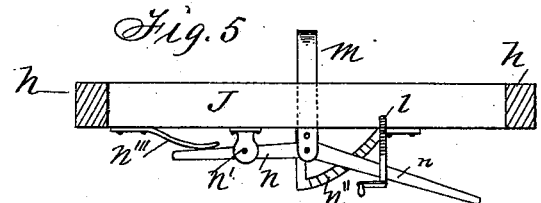
Witnesses:
R. H. Orwig,
W. A. Anderson.
Inventor:
Minos Miller,
By Thomas G. Orwig, Att'y.
N. PETERS, Photo-Lithographer, Washington, D. C.

UNITED STATES PATENT OFFICE.

MINOS MILLER, OF KNOXVILLE, IOWA.

BARREL TRUCK AND SUPPORT.

SPECIFICATION forming part of Letters Patent No. 333,144, dated December 29, 1885.

Application filed September 7, 1885. Serial No. 176,381. (No model.)

*To all whom it may concern:*

Be it known that I, MINOS MILLER, a citizen of the United States of America, and a resident of Knoxville, in the county of Marion and State of Iowa, have invented an Apparatus for Handling and Supporting Barrels, of which the following is a specification.

My invention consists in the construction and combination of a movable truck, a truck adjusting and propelling device, and barrel-fastening mechanism, as hereinafter set forth, pointed out in my claim, and illustrated in the accompanying drawings, in which—

Figure 1 is a side view, and Fig. 2 a top view, of my complete apparatus. Fig. 3 is a side elevation of a truck supporting a barrel, and with the propelling and handling and fastening devices detached. Fig. 4 is a perspective view of a barrel-fastening hook, and Fig. 5 a transverse section of the propelling and handling device to which the hook and hook-operating mechanism are attached.

A A represent runners, that are preferably made of wood plank, and connected by means of wooden cross-pieces B, that are fixed on the top edges of the runners by nailing, or in any suitable way. The cross-pieces are made concave in their centers, to engage the convex surface of a barrel. The pieces A A are wider in front than at the rear ends, for the purpose of inclining a barrel.

C C represent transverse braces fixed to the runners. They are preferably made of round wood, and secured by inserting their ends in bores in the runners, and then wedging the ends fast in the bores.

D is an axle having journals on its ends, and said journals extending into bearings (bores) formed in the front and curved ends of the runners in such a manner that when the rear ends of the runners are lifted the complete truck will rest upon the wheels D', fixed to the axle, to facilitate the moving of the complete truck and a barrel placed thereon.

*f f* are bars adjustably connected with the front cross-piece, B, in such a manner that their front pointed ends will prevent the truck from slipping when it is set up on end to receive or unload a barrel.

*g g* are cleats fixed in parallel and inclined position against the outside and rear ends of the runners A, for the purpose of forming bearings adapted to receive the free ends of my detachable propelling device.

A simple, cheap, and efficient truck is thus produced, that is adapted for supporting a barrel filled with molasses or any other kind of liquid in a cellar or store, in such a position that the liquid can be drawn therefrom through a faucet whenever desired.

*h h* are the handles of my truck adjusting and propelling device. They are preferably made of wood, and rigidly connected at their central portions by a wooden cross-piece, J, and braced at their rear ends by a wooden round, K. Their straight front ends are adapted in size and shape to slide forward between the cleats *g*, fixed to the runners of the truck.

*l* is a metal screw having a crank on its end that extends through a screw-seat in the cross-piece J, to engage the cross-piece B on the rear end of the truck, and to serve as a means of adjusting the handles in the bearings *g g*, as required in handling barrels of different lengths.

*m* is a hook adjustably placed in a slot formed through the cross-piece J in such a manner that it can be placed over the chine of a barrel and operated to clamp the barrel and truck together, as required in placing a barrel upon the truck.

*n* is a bent lever secured to a fulcrum, *n'*, that is fixed to the under side of the cross-piece J. The lower end of the hook *m* is pivoted to the bent lever in such a manner that the hook can be readily raised and lowered by means of the lever.

*n''* is a rack fixed to the cross-piece J, to engage a flange on the lever, for the purpose of locking the lever when it is depressed to clamp the hook fast to a barrel and the barrel to the truck.

*n'''* is a spring fixed to the same cross-piece in such a manner that it will in its normal condition hold the lever and hook elevated.

An adjustable and operative device is thus constructed that can be readily applied to numbers of my trucks successively for the purpose of placing barrels upon the trucks, and then moving the trucks and barrels about jointly.

To load a barrel upon one of my trucks, I first set the barrel on end. I then set my complete device on end at one side of the truck, and with the front and top portions of the runners close to the barrel. Then, by means of the screw $l$, I adjust the handles $h$ so as to bring the hook $m$ into contact with the chine of the barrel, and by means of the lever $n$ operate the hook, and thereby fasten the barrel and truck together, so that they can be jointly lowered into horizontal position, and the barrel thus placed on top of the truck. To move the truck and barrel about, I seize the rear ends of the handles $h$ and lift and push, in the manner of moving a wheelbarrow, to throw the weight upon the wheels D, and to propel the truck.

I claim as my invention—

The barrel-truck composed of runners A, having fixed cleats $g$, cross-pieces B, an axle, D, wheels D', and detachable handles $h$, having a cross-piece, J, carrying an adjustable screw, $l$, an adjustable hook, $m$, and hook-operating mechanism, substantially as shown and described, to operate in the manner set forth.

MINOS MILLER.

Witnesses:
 THOMAS G. ORWIG,
 S. I. STAUBER.